(12) United States Patent
Lupke et al.

(10) Patent No.: US 7,517,209 B2
(45) Date of Patent: Apr. 14, 2009

(54) MOLDING APPARATUS WITH MOLD BLOCKS HAVING PROFILED FACE ADJUSTMENT

(76) Inventors: Manfred A. A. Lupke, 92 Elgin Street, Thornhill, Ontario (CA) L3T 1W6; Stefan A. Lupke, 32 Vintage Lane, Thornhill, Ontario (CA) L3T 1X6

( * ) Notice: Subject to any disclaimer, the term of this patent is extended or adjusted under 35 U.S.C. 154(b) by 0 days.

(21) Appl. No.: 10/534,747

(22) PCT Filed: Nov. 12, 2003

(86) PCT No.: PCT/CA03/01719

§ 371 (c)(1),
(2), (4) Date: May 12, 2005

(87) PCT Pub. No.: WO2004/045828

PCT Pub. Date: Jun. 3, 2004

(65) Prior Publication Data

US 2006/0062869 A1 Mar. 23, 2006

(30) Foreign Application Priority Data

Nov. 15, 2002 (CA) ..................................... 2411881

(51) Int. Cl.
*B29C 47/90* (2006.01)

(52) U.S. Cl. ................ 425/192 R; 425/233; 425/326.1; 425/336; 425/369; 425/392; 425/396

(58) Field of Classification Search .............. 425/133.1, 425/192 R, 233, 325, 326.1, 336, 369, 388, 425/392, 396, 384
See application file for complete search history.

(56) References Cited

U.S. PATENT DOCUMENTS

| | | | | |
|---|---|---|---|---|
| 3,286,305 | A | * | 11/1966 | Seckel .......................... 425/396 |
| 3,380,121 | A | * | 4/1968 | Chittenden et al. ........... 425/528 |
| 3,430,292 | A | * | 3/1969 | Bauman et al. ............. 425/392 |
| 3,784,346 | A | * | 1/1974 | Maroschak .................. 425/532 |
| 4,226,580 | A | * | 10/1980 | Lupke et al. .............. 425/326.1 |
| 4,492,551 | A | * | 1/1985 | Hegler et al. ................. 425/144 |
| 5,582,849 | A | * | 12/1996 | Lupke .......................... 425/233 |
| 6,155,813 | A | * | 12/2000 | Lupke et al. .............. 425/326.1 |
| 6,457,965 | B1 | * | 10/2002 | Hegler .......................... 425/233 |
| 2004/0241266 | A1 | * | 12/2004 | Neubauer et al. ......... 425/326.1 |

FOREIGN PATENT DOCUMENTS

| | | | |
|---|---|---|---|
| DE | 20009030 U1 | * | 8/2000 |
| DE | 10148294 C1 | * | 1/2003 |
| WO | WO 03/031155 A1 | * | 4/2003 |

* cited by examiner

*Primary Examiner*—Robert B Davis
*Assistant Examiner*—Joseph Leyson

(57) ABSTRACT

A pipe molding apparatus includes a plurality of mold blocks (9) which move along a molding path to form double wall plastic pipe having an outer pipe wall with corrugations which set outside diameter of the pipe and an inner wall around a bore through the pipe. The mold blocks (9) have profiled faces which determine shape of the pipe. The profiled faces are reconfigureable in profile between first depth of the corrugations and diameter of the bore through the pipe without varying external diameter and while maintaining essentially constant wall thickness of the pipe.

7 Claims, 4 Drawing Sheets

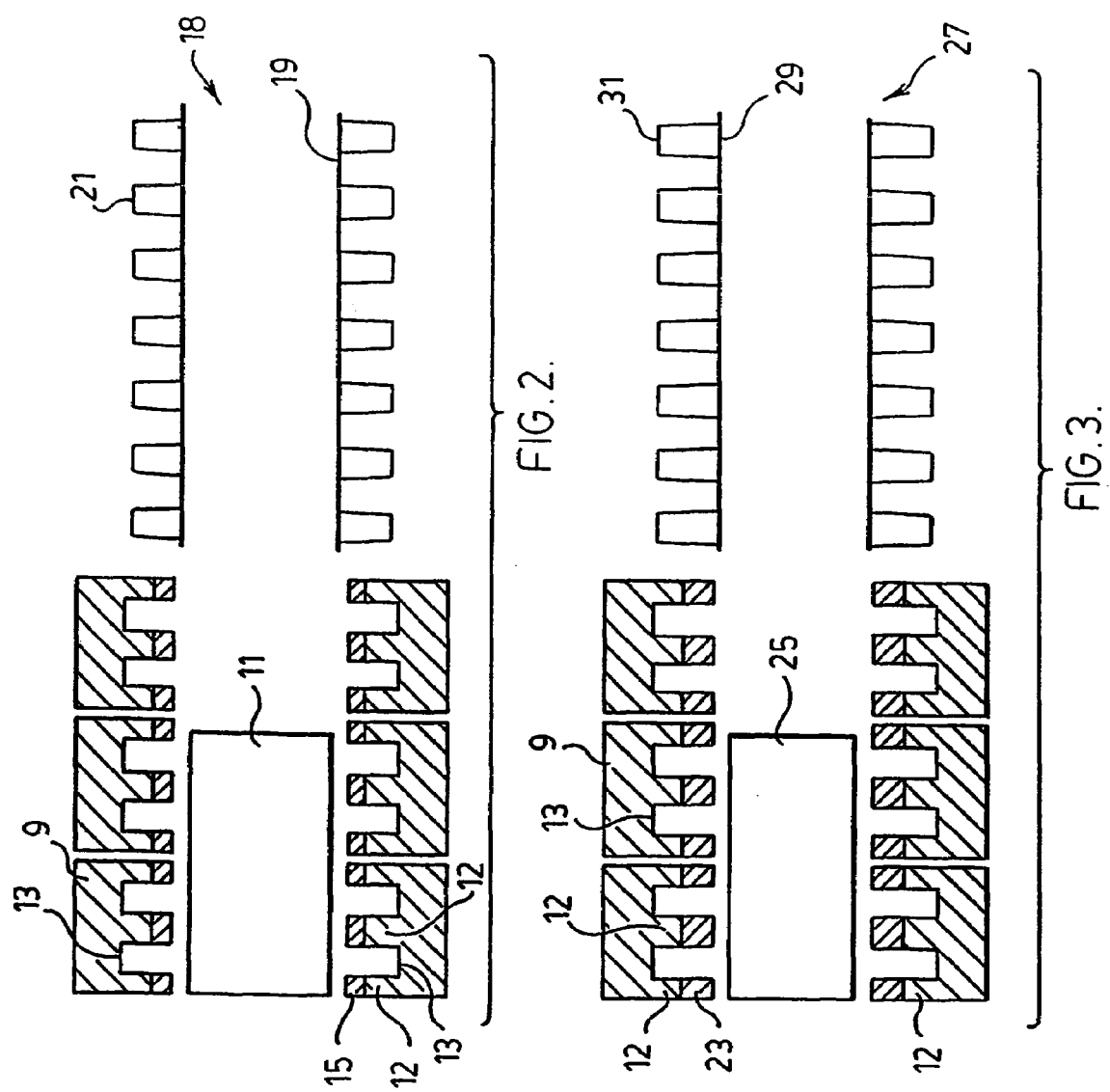

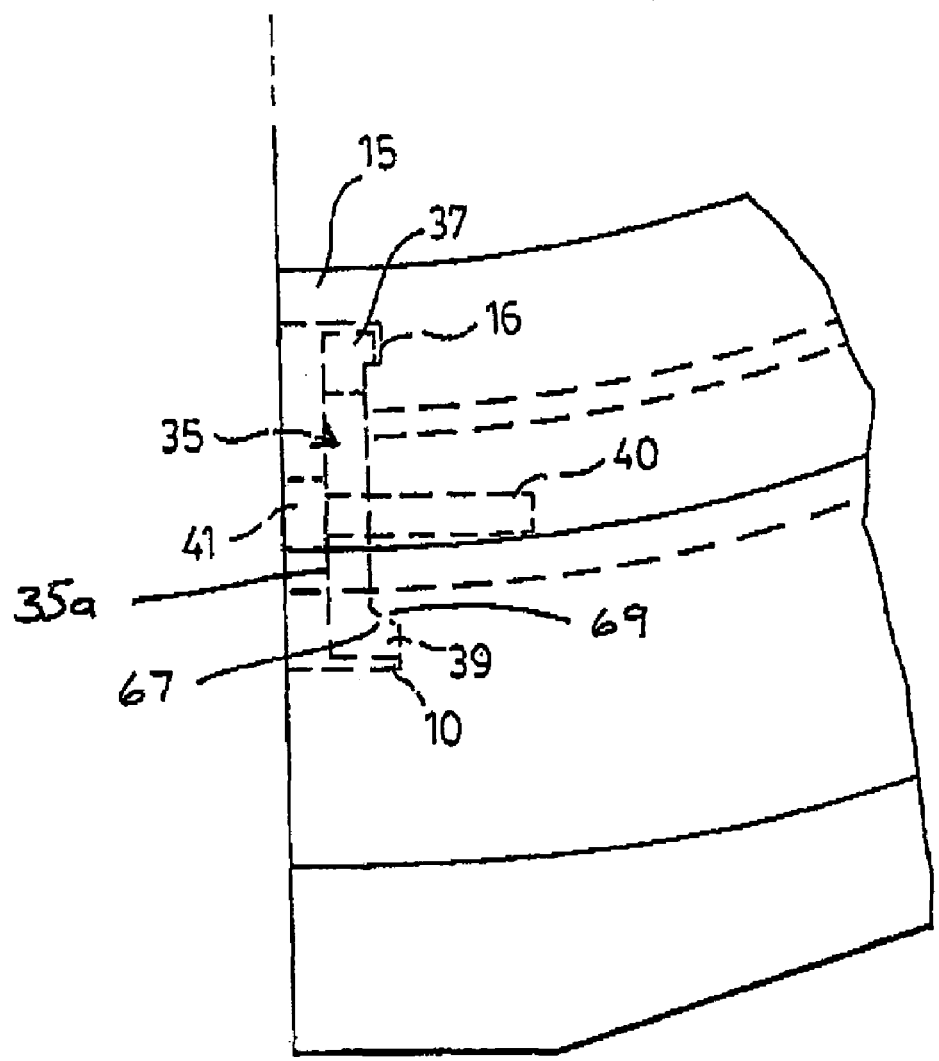

MOLDING APPARATUS WITH MOLD BLOCKS HAVING PROFILED FACE ADJUSTMENT

This application is the National Stage of PCT/CA03/01719 filed on Nov. 12, 2003, which claims foreign priority to Canadian Application 2,411,881 filed on Nov. 15, 2002.

FIELD OF THE INVENTION

The present invention relates to a pipe molding system including a mold tunnel formed by moving mold blocks in which the shape of the pipe can be varied without having to replace the mold blocks.

BACKGROUND OF THE INVENTION

In a traditional pipe molding apparatus of the type using mold blocks which move along a molding path to form what is known as a moving mold tunnel, the only way to change shape of the pipe is to replace the pipe forming mold block sections. This is very costly in that these mold block sections themselves are extremely expensive because they include features such as vacuum openings, cooling channels etc. required in the formation of the pipe. However, according to known pipe forming devices using moving mold tunnels it is a requirement to have interchangeable mold block sections to produce different shapes and sizes of pipes.

Different job applications require different pipe strengths even though the same diameter of pipe may be required for each job application. It would seem that a simple way of dealing with this situation is to vary the wall thickness of the pipe to make the pipe either stronger i.e., more rigid through increased wall thickness or to make the pipe softer i.e., more flexible through decreased wall thickness. However, industry standards dictate that a certain wall thickness is required which does not allow thinning of pipe walls for making a pipe more flexible.

Most pipes derive wall strength through the provision of corrugations at the outer surface of the pipe. It is known that a pipe with a taller corrugation is stronger than a pipe with a shorter corrugation. Again, according to known plastic pipe extruding processes it is not possible to vary the corrugation height of a pipe without replacement of the mold block sections in the corrugator.

SUMMARY OF THE PRESENT INVENTION

The present invention provides a molding system which is able to provide changes to the shape of an extruded pipe without having to replace the entire mold block sections in the molding system.

In particular, the present invention provides a pipe molding system which makes a continuous length of plastic pipe with the system including mold block sections having profiled faces which are refigurable in their face profile to provide pipe shape variances without having to replace the entire mold blocks.

According to an aspect of the present invention, the molding system includes a plurality of mold blocks which move along the molding path to form double wall plastic pipe having an outer wall with corrugations which set outside diameter of the pipe and an inner wall around a bore through the pipe. The sections of the mold blocks have profiled faces which determine shape of the pipe and those profiled faces are reconfigurable in profile between a first and a second face profile to vary both depth of the corrugations and diameter of the bore through the pipe. This is done without varying external diameter of the pipe while maintaining essentially constant thickness of the pipe walls.

As a result of the immediately above aspect of the present invention a single molding system without the requirement for mold block replacement can be used to make either a stronger i.e., more rigid pipe or a softer i.e., more flexible pipe.

BRIEF DESCRIPTION OF THE DRAWINGS

The above as well as other advantages and features of the present invention will be described in greater detail according to the preferred embodiments of the present invention in which;

FIG. 1 is a schematic view of a pipe molding apparatus used in a pipe mold system according to a preferred embodiment of the present invention;

FIG. 2 is a further schematic view of the pipe molding region of the apparatus of FIG. 1 with the mold blocks set up in a first face profile condition to produce a relatively flexible length of corrugated pipe;

FIG. 3 is a further schematic view of the molding region of the apparatus of FIG. 1 with the mold blocks set in a second face profile condition to produce a relatively rigid length of corrugated pipe;

FIG. 6 is a sectional view through the mold block section of FIG. 4.

DETAILED DESCRIPTION ACCORDING TO THE PREFERRED EMBODIMENTS OF THE PRESENT INVENTION IN WHICH

Figure 1:
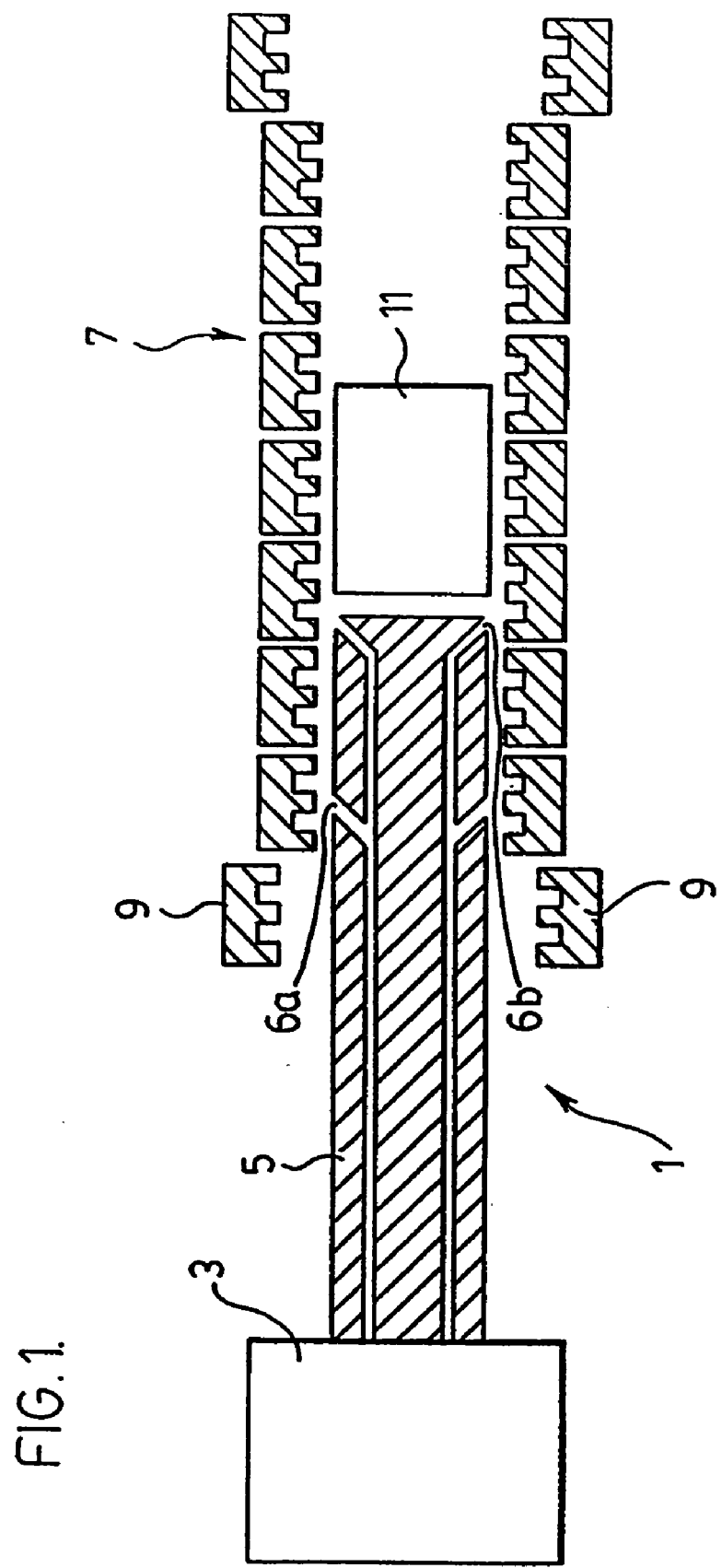
FIG. 1 is

FIG. 1 shows a pipe molding apparatus generally indicated at 1. This pipe molding apparatus includes an extruder 3 which provides molten plastic through plastic flow channels of an extruder die 5 to a moving mold tunnel generally indicated at 7. The moving mold tunnel is formed by a plurality of mold block sections 9 to each side of the mold tunnel. These mold block sections have profiled i.e., corrugated faces to receive plastic from the two channel mouths 6a and 6b of the die equipment located within the mold tunnel. The plastic emanating from channel mouth 6a flows into the troughs in the faces of the mold blocks to form an outer corrugated wall of the pipe. The plastic emanating through channel mouth 6b forms an inner pipe wall bordering a central bore through the pipe. The molten plastic of the inner pipe wall is set to shape and cooled by a cooling plug 11 internally of the mold tunnel.

FIG. 2 of the drawings shows the apparatus set up to produce a double wall pipe 18 having an inner pipe wall 19 and an outer corrugated pipe wall 21.

Each of the mold blocks 9 includes a trough 13 to shape the corrugations 21 on pipe 18. These corrugations set the outside diameter of the pipe.

Each of the mold blocks further includes a mold block crest between each of the troughs 13. In accordance with a preferred embodiment of the present invention the height of this mold block crest is variable to vary the depth of the corrugations. This variance in turn produces a bore diameter change in the pipe with little or no change to the wall thicknesses of the pipe.

Again referring to FIG. 2 of the drawings, each of the mold block sections 9 has a mounting surface 12 on each side of each of the troughs 13 in the mold block section. This mounting surface 12 is adapted to interchangeably receive different mold block crest forming attachments. In FIG. 2, crest forming attachments 15 are mounted to each of the mold block mounting surfaces 12.

Now turning to FIG. 3 it will be seen that the mold block sections 9 and in particular the profiled faces of the mold block sections have been reconfigured from the FIG. 2 face profile to a different face profile. This is done by the attachment of crest forming attachments 23 to the mounting surfaces 12 of the mold block sections in the FIG. 3 set up. Crest forming attachments 23 of FIG. 3 are substantially longer than crest forming attachments 15 of the FIG. 2 set up. Furthermore as will be seen in FIG. 3 of the drawings the pipe generally indicated at 27 formed using the FIG. 3 set up includes an outer wall formed by corrugations 31 which are substantially taller than the corrugations 21 of pipe 18 from FIG. 2. Furthermore, in FIG. 3 the bore diameter of the pipe 27 defined by the inner pipe wall 29 is substantially smaller than the bore diameter through pipe 18 defined by inner wall 19 in FIG. 2. Accordingly, pipe 27 of FIG. 3 is a substantially stronger or more rigid pipe than pipe 18 of FIG. 2. However, the overall external diameter of the two pipes is identical. Furthermore, the wall thickness of pipe 18 is essentially the same as the wall thickness of pipe 29.

The reconfiguration of the pipe from the FIG. 2 pipe shape to the FIG. 3 pipe shape is achieved simply by the use of interchangeable face attachments of different heights at the mold block faces without having to replace the mold block sections. In addition, it will be noted in FIG. 3 that a smaller diameter cooling plug 25 has replaced the larger diameter cooling plug 11 to form the smaller bore pipe 27 of FIG. 3.

Figure 4:
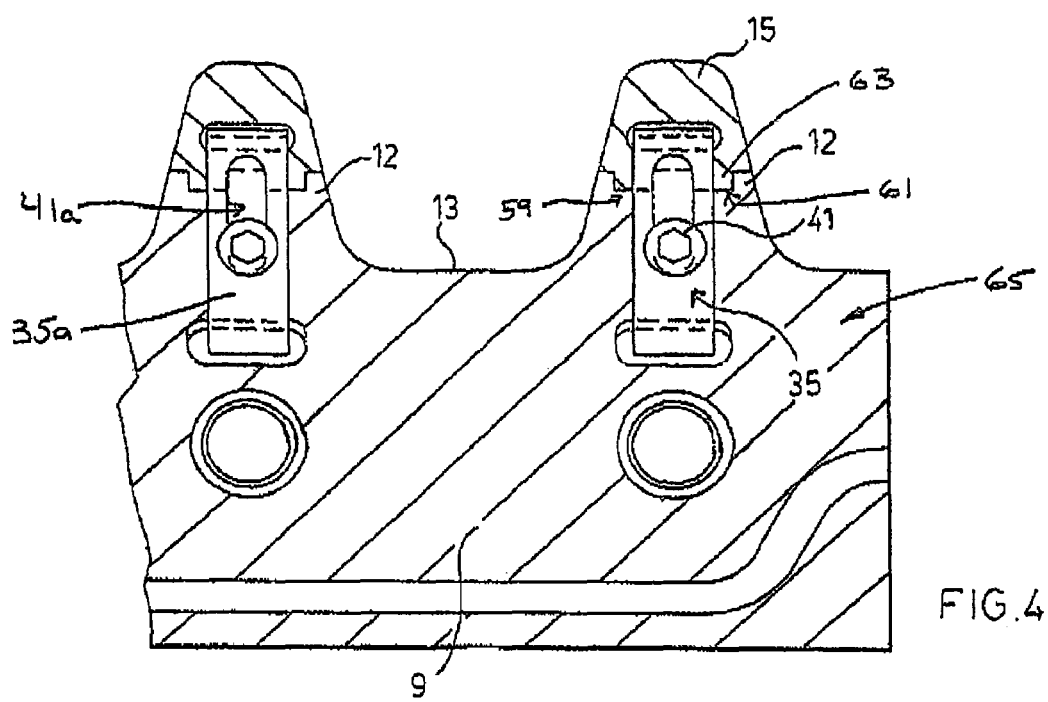
FIG. 4 is a front view of one of the mold block sections with the apparatus set up in the FIG. 2 condition.
Figure 5:
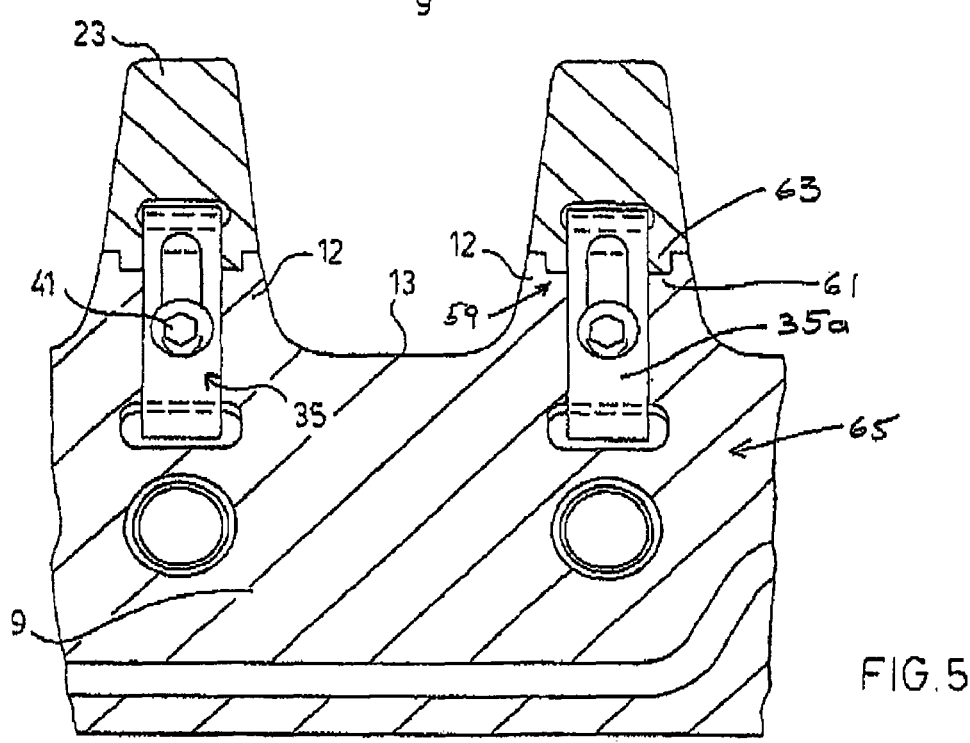
FIG. 5 is a front view of one of the mold block sections of the apparatus set up in the FIG. 3 condition.

FIGS. 4 and 5 of the drawings show a number of preferred features of the present invention. In particular, FIG. 4 shows a mold block section 9 provided with the shorter crest forming members 15 supported by the mounting surfaces 12 to either side of the troughs 13 in the face of the mold block sections. FIG. 5 on the other hand shows the taller crest forming members 23 fitted to the mounting surfaces 12 to either side of the trough 13 in the profiled face of mold block section 9.

A number of other features can be seen in FIGS. 4 and 5 of the drawings. In particular, these drawings show that the mold block sections include sophisticated vacuum and cooling channels required to first shape and then cool the plastic at the faces of the mold blocks. The interchangeability of the face attachments at the mounting surfaces 12 of the mold block sections in no way impedes or affects either the vacuum or the cooling channels.

FIGS. 4, 5 and 6 also show a particular means of replaceably mounting the face attachments to the mold block sections. This means comprises a bracket 35 having forwardly extending arms 37 and 39 to opposite ends of the bracket. The mounting surface of the mold block section is provided away from the pipe forming region with a bore 40 to receive a threaded bolt 41. Also provided in the mold block section is a recess 10 for receiving the leg 39 of bracket 35. A similar recess 16 is provided in the face attachment 15 to receive the leg 37 of bracket 35.

As will be appreciated from the description above the bracket is easily secured to and removed from the mold block to secure face attachment 15 or to replace it with face attachment 23 which has a corresponding bracket receiving recess.

FIGS. 4, 5 and 6 illustrate a number of features of the mold blocks of the molding system. The troughs 13 and the crest mounting surfaces 12 of the mold block sections 9 are integral. Furthermore, the troughs 13 have a fixed relationship with the vacuum and cooling channels shown in the figures. With this arrangement, the crest forming parts 15 are replaceable on the mounting surfaces 12 to either side of the troughs 13 that are integral to the mold block sections. With this arrangement, the interchangeable face attachments do not affect the relationship of the vacuum and cooling channels to the integral troughs. The replaceable crest forming parts allow the depth of the corrugations of the produced pipe to be adjusted. This adjustment is further enhanced by the replaceable cooling plugs associated with the specific crest forming parts. With this arrangement, the outer dimension of each different size pipe produced by the system is fixed as it is determined by the troughs which are integral to the mold block sections. The depths of the corrugations of the pipe are variable by the interchange of the cooling plugs and the use of the different crest forming parts. In the preferred embodiment, the thickness of the inner wall of the double walled pipe is also maintained at a similar section.

FIGS. 4 and 5 also illustrate the step profile 59 of the crest mounting portion 12. This step profile includes an upwardly opening center recess 61 centered between two adjacent troughs 13. This recess receives the projecting shoulder 63 provided on each crest forming part 15 or 23. The shoulder is sized to have a close fit with the center recess 61. With this arrangement, each crest forming part 15 or 23 is maintained in alignment between two adjacent troughs and is secured in the abutment faces 65 of the mold block sections 9. Each crest forming part is removed from the mold block by movement of the crest forming part upwardly out of the respective upwardly opening recess.

FIG. 6 illustrates the particular cooperation between the bracket 35, the bolt 41, and legs 37 and 39 provided either end of the body 35a of the bracket. The leg 37 engages the recess 16 whereas the leg 39 includes a diagonal face 67 which engages the diagonal face 69 of the recess 10. The bolt 41 is located in slot 41a of the bracket 35. In the secured position of the crest forming part 15 on the crest mounting portion 12 as shown in FIG. 6, diagonal faces 67 and 69 are in engagement and bolt 41 secures the bracket 35 in the mold block.

Release of the brackets 35 by release of the bolt 41 alldws the crest forming parts to easily separate from the mold block section. Basically, the crest forming parts 15 and 23 sit or mount on the crest forming parts and once the brackets 35 are moved to a release position, the crest forming parts may be removed.

Although various preferred embodiments of the present invention have been described in detail, it will be appreciated by those skilled in the art that variations may be made without departing from the spirit of the invention or the scope of the appended claims.

The invention claimed is:

1. A molding system producing corrugated pipe including a first series of mold blocks secured to a drive arrangement moving said mold blocks along a molding path and abutting with a second series of mold blocks secured to a drive arrangement for moving along said molding path with said first and second series of mold blocks forming a moving mold tunnel determining the shape of the corrugated pipe; and wherein each mold block includes a plurality of troughs integral to the mold block with the troughs spaced in a length of the mold block;

each mold block between adjacent troughs including a crest mounting portion integral with the mold block with each crest mount portion including between adjacent troughs an upwardly opening recess on said crest mounting portion;

said molding system including first and second crest forming parts where each crest forming part is mountable on one of said cresting mounting portions and cooperates with the troughs either side thereof to form corrugations in the corrugated pipe;

said first crest forming parts when secured on said mold blocks producing corrugated pipe with corrugations of a first size and said second crest forming parts when secured on said mold blocks producing corrugated pipe with corrugations of a second size greater than the first size;

each crest forming part including a projection of a shape for receipt in and abutment with one of said upwardly opening recesses;

each mold block with respect to each crest forming part includes mounting bracket arrangements at opposite ends of the crest forming part securing said crest forming part in said recess of the respective crest mounting portion; and wherein each crest forming part is removable from a mold block by release of said mounting bracket arrangements and movement of the crest forming part upwardly out of the respective upwardly opening recess.

2. A molding system as claimed in claim 1 including a first interior cooling plug sized to cooperate with said first crest forming parts and determine an inner wall of a first double walled pipe, and a second interior cooling plug sized to cooperate with said second crest forming parts and determine an inner wall of a second double walled pipe.

3. A molding system as claimed in claim 1 wherein each mounting bracket arrangement includes a bracket secured by a bolt in engagement with the mold block and each bracket includes a body with a first arm extending from one end thereof with said first arm received in a recess of the crest forming part and a second arm extending from said body and spaced from said first arm received in a recess in said mold block.

4. A molding system as claimed in claim 1 wherein each mold block includes vacuum and cooling channels having a fixed relationship with said integral troughs.

5. A molding system as claimed in claim 2 wherein said first crest forming parts are longer than said second crest forming parts and said first cooling plug is of smaller diameter than said second cooling plug.

6. A molding system as claimed in claim 1 wherein said upwardly opening recess is centered on said crest mounting portion, and wherein said projection is centered on said crest forming part.

7. A pipe molding apparatus for making a continuous length of plastic pipe, said apparatus comprising first and second mold block sections each having profiled faces formed by crests and troughs on the profiled faces of the mold block sections;

a first set of face attachments and a second set of face attachments;

the first and second sets of face attachments including projecting shoulders that are interchangeably and releasably insertable into upwardly opening recesses in the profiled faces of the mold block sections by separation of said face attachments upwardly away from said upwardly opening recesses;

first and second cooling plugs of diameters differing from one another;

the first and second mold block sections circulating to and away from a molding tunnel of the apparatus which contains one of said cooling plugs, the mold tunnel receiving a continuous stream of molten plastic forming pipe with an internal bore over one of the cooling plugs and receiving a further stream of molten plastic forming a wall having an undulating exterior surface around said bore;

the undulating surface defining external diameter of the pipe;

the first mold block sections closing with the second mold block sections to form a moving line of closed mold blocks while circulating through the mold tunnel and the first and second mold block sections parting from one another while circulating away from and back to the mold tunnel;

said apparatus when in a first set up condition producing pipe with a first bore diameter when the first set of face attachments are fitted to the profiled faces of the first and second mold block sections and when the first cooling plug is placed in the mold tunnel and the apparatus when in a second set up condition producing pipe with a second bore diameter different from the first bore diameter while maintaining essentially constant wall thickness of the pipe when the second set of face attachments are fitted to the profiled faces of the first and second mold block sections and secured at the ends of the mold block sections and when the second cooling plug is placed in the mold tunnel;

the external diameter of the pipe remaining constant in both the first and the second set up conditions of the apparatus; and wherein each mold block includes integral trough portions that define the external diameter of the pipe;

said integral trough portions having a fixed relationship with vacuum and cooling channels of each mold block.

* * * * *